Patented Nov. 17, 1936

2,061,063

UNITED STATES PATENT OFFICE

2,061,063

TANNING PROCESS

Charles Dangelmajer, Niagara Falls, N. Y., and Ezra Clinton Perkins, Wilmington, Del., assignors to E. I. du Pont de Nemours & Company, Inc., Wilmington, Del., a corporation of Delaware No Drawing. Application April 12, 1935,
Serial No. 16,023

3 Claims. (Cl. 149—4)

This invention relates to the hardening of proteins and more particularly to processes involving the hardening of proteins, wherein protein materials or compositions containing proteins are treated with a protein hardening agent or tanning agent.

It is known that tanning agents such as tannic acid, formaldehyde, formaldehyde polymers, acetaldehyde, oak extract, alum, chromium salts and similar materials will react with casein, animal glue, vegetable proteins, hide substance and other proteins and protein containing substances to render the protein hard and more or less insoluble in water. In such operations the tendency for the hardening action to prevent or inhibit complete penetration by the hardening agent often causes difficulties and various tedious operations are necessary to overcome this tendency. For example, in making casein plastics, a form is first molded from casein and subsequently hardened by immersion for long periods of time in a dilute solution of formaldehyde. If the formaldehyde solution is too strong, the hardening of the casein on the exterior prevents complete penetration of the solution.

As another example, use is made of the insolubilizing action of formaldehyde on casein or other protein in preparing insoluble films on paper, making adhesives, paints and in plastics manufacture. A common practice is to prepare first, a film from an aqueous solution of casein which contains an alkaline agent, such as borax, for rendering the casein soluble.

The film then is dried and treated with formaldehyde, tannic acid or similar hardening agent, which causes the film to become relatively insoluble in water. A similar practice is used for hardening animal glue films. Often difficulty is encountered when the films are relatively thick because the hardening takes place on the surface only and penetration of the hardening agent into the film is retarded by the relatively insoluble surface produced by the hardening agent. This can sometimes be avoided by using relatively dilute solutions of hardening agent, such as formaldehyde, which permits the penetration to the desired degree but this method requires long periods of time to effect the desired penetration unless the film is very thin.

The tanning of animal hides to make leather is a further example of a protein hardening operation in which difficulties are encountered in obtaining rapid and complete penetration of the protein hardening agent (tanning agent). If the tanning solution is too strong, the hide is tanned only to a relatively shallow depth, leaving the interior of the hide untanned or incompletely tanned. Therefore, to obtain thorough and uniform tanning, the hides must be soaked for long periods of time in a relatively dilute tanning liquor. It is an object of this invention to provide a means for inhibiting the reaction between protein materials and protein hardening agents. A further object is to provide a process for delaying the hardening action of a hardening agent on a protein material during a pre-determined period of time, after which the hardening action is permitted to occur. Further objects of this invention include providing improved methods for tanning hides, manufacture of protein plastics and other processes in which proteins are acted upon by protein hardening agents. Still other objects will become apparent from the following description of the invention.

These objects may be accomplished in accordance with the present invention by subjecting the protein material to the action of a hardening agent in the presence of a fatty acid amide. We have discovered that when a protein is subjected to the action of a protein hardening material in the presence of a fatty acid amide, the hardening effect is markedly inhibited or delayed. The degree of inhibition or delay in a given protein hardening operation under given conditions of temperature, etc., is in general proportional to the concentration of the fatty acid amide.

The various water soluble fatty acid amides are suitable for practicing our invention, e. g., formamide, acetamide, propionamide, butyramide, etc. We prefer to employ formamide, since this amide, in a given concentration, is much more effective in inhibiting the action of the hardening agents on proteins than other members of the homologous series of fatty acid amides. If too little amide is present when the protein material is treated with the hardening agent, the desired rapidity of penetration will not be effected. On the other hand, if sufficiently large amounts of the fatty acid amide are employed, the hardening agent will rapidly penetrate the protein material but will fail to harden it without further treatment. In such case, hardening may be effected by subsequently drying the protein material or subjecting it to mild heat, e. g., heating to a temperature of 50–90° C. In most cases, e. g. in leather tanning, we prefer to so adjust the fatty acid amide concentration in the tanning liquor that appreciable (e. g. a partial) tanning effect is obtained in the soaking operation, yet with rapid penetration of the tanning liquor into the hide. After removal from the tanning liquors and drying, the tanning will be complete.

In one embodiment, the present invention may be utilized to effect penetration of protein hardening agent into protein or protein containing materials. According to this method, the fatty acid amide is mixed with either the protein material or with the hardening agent, or both, prior to contacting the protein with the hardening agent. For example, in leather tanning, the hide to be tanned may first be impregnated with formamide or a solution thereof and then treated with a solution of the tanning agent. Alternatively the amide may be added to the tanning solution and this used to treat the hide, which may or may not be impregnated with the fatty acid amide. The presence of the fatty acid amide delays the hardening action until the tanning agent has fully penetrated the hide, thus allowing complete penetration of the tanning agent.

In a similar manner, our invention may be used in embalming operations, to insure complete penetration of the embalming fluid (commonly a formaldehyde solution) before the protein components of the tissues of the cadaver become hardened. For example, an embalming fluid may be made which contains formaldehyde or other suitable tanning agent and a fatty acid amide such as formamide and this injected into the cadaver in the regular manner.

In like manner, the penetration of a hardening agent solution into various solid protein-containing materials, e. g., molded shapes of casein, etc., may be improved according to the present invention by adding a soluble fatty acid amide to the hardening agent solution.

The amount of fatty acid amide employed in practicing the present invention may be varied between wide limits, depending on the effect desired and the nature and proportions of other ingredients. The minimum amount of the amide to be employed will vary, depending on the respective natures of the protein, fatty acid amide and hardening agent employed and the presence of conditions and/or ingredients which effect the hardening action.

The herein described invention is applicable to the hardening of various proteins or protein-containing materials of both animal or vegetable origin. The various known protein hardening agents are suitable for practicing our invention, for example, phenolic hardening agents such as tannic acid, inorganic hardening agents, e. g., chromium salts, or aldehydes such as formaldehyde. In place of formaldehyde, the various formaldehyde derivatives or substances which react or decompose to liberate formaldehyde, including polymeric forms of formaldehyde, may be used. Throughout this specification and in the appended claims, the term "formaldehyde derivative" is used to include the polymeric form of formaldehyde liberating substances which are suitable for use as protein hardening agents. The invention is capable of a wide variety of uses, wherever it is desired to treat protein material with a protein hardening agent. Among such uses are leather tanning, manufacture of protein plastics, e. g., casein plastics and embalming.

This is a continuation in part of the co-pending application Serial Number 2,751 by Charles Dangelmajer.

We claim:—

1. A tanning process comprising treating animal skins with a solution of a tanning agent containing a water soluble fatty acid amide.

2. A tanning process comprising treating animal skins with a solution of a tanning agent containing formamide.

3. A tanning process comprising treating animal skins with a tannin solution containing formamide.

CHARLES DANGELMAJER.
EZRA CLINTON PERKINS.